(12) United States Patent
Kim

(10) Patent No.: US 11,745,691 B2
(45) Date of Patent: Sep. 5, 2023

(54) DEVICE FOR COUPLING CURTAIN AIRBAG TO VEHICLE BODY

(71) Applicant: HYUNDAI MOBIS CO., LTD., Seoul (KR)

(72) Inventor: Ju Kyung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/661,792

(22) Filed: May 3, 2022

(65) Prior Publication Data

US 2022/0371539 A1 Nov. 24, 2022

(30) Foreign Application Priority Data

May 24, 2021 (KR) ................ 10-2021-0066246

(51) Int. Cl.
*B60R 21/232* (2011.01)

(52) U.S. Cl.
CPC ................. *B60R 21/232* (2013.01)

(58) Field of Classification Search
CPC ..... B60R 21/20; B60R 21/201; B60R 21/213; B60R 21/2165; B60R 21/232
See application file for complete search history.

(56) References Cited

U.S. PATENT DOCUMENTS

| | | | |
|---|---|---|---|
| 7,823,914 B2* | 11/2010 | Cheal | B60R 21/213 280/730.2 |
| 7,862,075 B2* | 1/2011 | Minamikawa | B60R 21/217 280/728.2 |
| 8,006,998 B2* | 8/2011 | Hatfield | B60R 21/232 280/730.2 |
| 8,056,924 B2* | 11/2011 | Hatfield | B60R 21/213 280/730.2 |
| 8,091,918 B2* | 1/2012 | Mitchell | B60R 21/201 280/730.2 |
| 8,240,701 B2* | 8/2012 | Cheal | B60R 21/201 280/730.2 |
| 8,562,016 B2* | 10/2013 | Higano | B60R 21/213 280/730.2 |
| 8,820,779 B1* | 9/2014 | Low | B60R 21/232 280/728.2 |
| 9,487,175 B2* | 11/2016 | Noma | B60R 21/214 |
| 9,580,036 B2* | 2/2017 | Choi | B60R 21/213 |
| 9,981,625 B2* | 5/2018 | Witt, Jr. | B60R 21/213 |
| 10,005,419 B2* | 6/2018 | Konaka | B60R 21/237 |
| 10,322,692 B2* | 6/2019 | Ma | B60R 21/213 |
| 10,647,285 B2* | 5/2020 | Christiansen | B60R 21/232 |
| 10,960,842 B2* | 3/2021 | Shimizu | B60R 21/232 |

(Continued)

FOREIGN PATENT DOCUMENTS

| | | |
|---|---|---|
| JP | 2014218117 A * | 11/2014 |
| KR | 2005-0054579 | 6/2005 |

*Primary Examiner* — Laura Freedman
(74) *Attorney, Agent, or Firm* — DLA PIPER LLP (US)

(57) ABSTRACT

A device for coupling a curtain airbag to a vehicle body, the device including a bracket made of a metallic material and having an upper end installed on a vehicle body and disposed adjacent to a roof of a vehicle, and a lower end extending downward and having a through-hole, and a connection tab having a lower end coupled to a curtain airbag, having a main body extending upward, and having an upper end extending upward, penetrating the through-hole of the bracket, and coupled to the main body.

9 Claims, 3 Drawing Sheets

(56) References Cited

U.S. PATENT DOCUMENTS

| | | | |
|---|---|---|---|
| 10,974,682 B2* | 4/2021 | Iwata | B60R 21/237 |
| 11,130,464 B2* | 9/2021 | Dinsdale | B60R 21/232 |
| 11,370,379 B2* | 6/2022 | Abelenda Alcalde | B60R 21/232 |
| 2021/0253053 A1* | 8/2021 | Callewaert | B60R 21/20 |
| 2022/0297627 A1* | 9/2022 | Kim | B60R 21/213 |
| 2022/0355757 A1* | 11/2022 | Kim | B60R 21/213 |

* cited by examiner

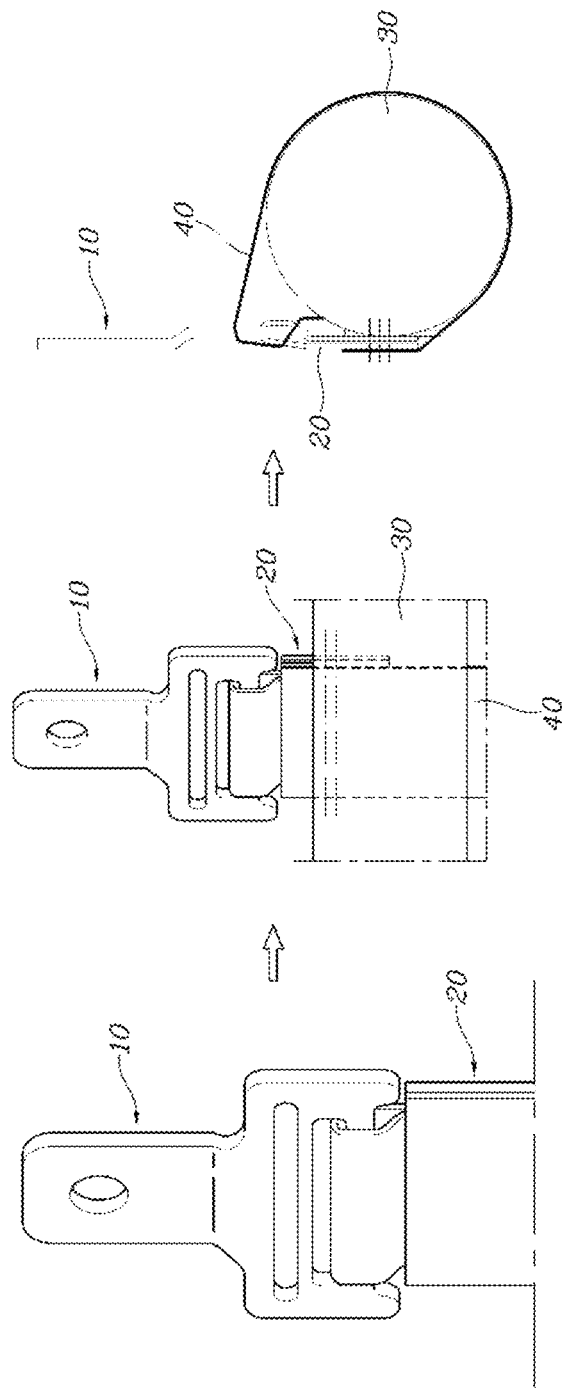

DEVICE FOR COUPLING CURTAIN AIRBAG TO VEHICLE BODY

CROSS REFERENCE TO RELATED APPLICATION

The present application claims priority of Korean Patent Application No. 10-2021-0066246 filed on May 24, 2021, the entire contents of which is incorporated herein for all purposes by this reference.

BACKGROUND OF THE DISCLOSURE

Field of the Disclosure

The present disclosure relates to a device for coupling a curtain airbag to a vehicle body, and more particularly, to a technology for coupling a curtain airbag to a roof of a vehicle.

Description of the Related Art

New vehicles are being developed in consideration of safety of occupants and environmental protection with the highest priority. In particular, separate safety devices for safely protecting occupants in the event of accidents are considered important.

Representative examples of the safety devices widely known and universally used already may include safety belts provided in seats and airbag systems. The safety belt restrains an occupant's upper body, i.e., the occupant's chest and waist to a seat and mainly serves to prevent the occupant's body from bouncing out forward by inertia in the event of a frontal collision of the vehicle, thereby minimizing death or injury. Meanwhile, the airbag system serves to prevent an occupant's head, which is not restrained by a safety belt to a seat, from being injured in the event of a frontal collision or broadside collision of a vehicle. Further, the airbag system serves to protect a chest and a head of a child, who cannot normally fasten the safety belt because of a body condition, or an occupant who does not fasten the safety belt, thereby preventing death or injury.

The airbag system, which is the safety device for protecting an occupant from impact caused by a collision in the event of a frontal collision or broadside collision accident of a vehicle, broadly includes a collision detection system and an airbag module. The collision detection system includes a collision sensor, a battery, and a diagnosis device. The airbag module includes an airbag and a gas-operating inflator configured to inflate the airbag.

Therefore, when the collision sensor detects a collision, the gas-operating inflator is exploded, and the airbag is instantaneously inflated by gas produced by the explosion. A pressure of the gas applied in this case is a high pressure that rapidly diffuses the gas within a short period of time of about 0.05 second from the moment of the collision to a point in time at which the airbag is fully deployed and operates. As the operating gas, a high-pressure gas produced by rapid ignition of a solid is used, or a gas stored in a high-pressure gas container is used.

Meanwhile, the aforementioned airbag system is often mounted in a front seat, i.e., a driver seat and a passenger seat. To prevent an occupant's head or face from bouncing out forward by inertia and colliding with a steering wheel in the driver seat or a glove box of an instrument panel in the passenger seat in the event of a frontal collision (or, head-on collision) of a vehicle, the airbag system is mounted in a horn cap of the steering wheel in the driver seat or mounted in the glove box in the passenger seat. Further, a curtain airbag is embedded in an inner surface of a head lining in an interior of a vehicle to prevent the occupant's body from colliding with a vehicle body including a door and being injured even in the event of a broadside collision.

A device for coupling a curtain airbag to a vehicle body in the related art is designed such that a curtain airbag is sewn on a connection tab made of a fabric material and the connection tab is coupled to a roof of the vehicle.

However, this coupling method has a problem in that the connection tab made of a fabric material is damaged by a weight of the curtain airbag and the curtain airbag cannot be normally deployed.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to provide a configuration in which a bracket made of a metallic material is coupled to a roof side of a vehicle body, and a connection tab made of a fabric material connects a curtain airbag and the bracket, such that the curtain airbag is coupled to the roof of the vehicle.

A device for coupling a curtain airbag to a vehicle body according to the present disclosure includes: a bracket made of a metallic material and having an upper end installed on a vehicle body and disposed adjacent to a roof of a vehicle, and a lower end extending downward and having a through-hole; and a connection tab having a lower end coupled to a curtain airbag, having a main body extending upward, and having an upper end extending upward, penetrating the through-hole of the bracket, and coupled to the main body.

The device may further include a strap having one end coupled to the lower end of the connection tab, and the other end connected to the bracket while surrounding an outer peripheral surface of the curtain airbag in a state in which the curtain airbag is rolled.

A strap hole may be penetratively formed in the bracket and disposed at a position above the through-hole, and the other end of the strap may pass through the through-hole and be fixed to the bracket or the connection tab while surrounding the outer peripheral surface of the airbag cushion.

The other end of the strap having passed through the strap hole may pass through the through-hole and fix the rolled curtain airbag.

The other end of the strap having passed through the strap hole may be coupled and fixed to the connection tab by sewing.

The device may further include a protrusion portion protruding outward from a lower end of the bracket; and a fixing hole penetratively formed at the other end of the strap, and the protrusion portion may be inserted into the fixing hole formed in the other end of the strap having passed through the strap hole such that the strap is fixed to the bracket.

The protrusion portion may be provided as a pair of protrusion portions protruding from two opposite ends of the lower end of the bracket based on a leftward/rightward direction, the fixing hole may extend in the leftward/rightward direction of the bracket, and the pair of protrusion portions may be inserted into the fixing hole to fix the strap.

The strap connected to the bracket may be cut or disconnected from the bracket when the curtain airbag is deployed.

The strap may include a tear line extending in a direction intersecting a longitudinal direction, and the tear line may be cut by a deployment pressure when the curtain airbag is deployed, such that the curtain airbag is deployed downward.

The connection tab may be made of a fabric material and coupled to the curtain airbag by sewing.

A bolt hole may be penetratively formed at the upper end of the bracket, an auxiliary hole may be penetratively formed at the upper end of the bracket and spaced apart from the bolt hole, and the bracket may further include: a clip inserted into both the bolt hole and the auxiliary hole and configured to restrict a rotation of the bracket; a bolt passing through the bolt hole together with the clip and configured to fix the bracket to the roof of the vehicle; and a washer disposed between the bolt and the clip and configured to disperse a pressure of the bolt.

According to the device for coupling a curtain airbag to a vehicle body according to the present disclosure, the bracket made of a metallic material may be coupled to the roof side of the vehicle body, the bracket and the connection tab may be connected to each other, and the curtain airbag may be coupled to the connection tab. Therefore, the bracket may support the load of the curtain airbag, thereby preventing the curtain airbag from being decoupled from the roof of the vehicle.

The other end of the strap having one end connected to the connection tab may be connected to the bracket while surrounding the outer peripheral surface of the rolled curtain airbag, and the strap may be cut or disconnected from the bracket when the curtain airbag is deployed, which makes it possible to quickly deploy the curtain airbag.

BRIEF DESCRIPTION OF THE DRAWINGS

FIG. 3 is a view illustrating a sequence of coupling the curtain airbag by using the device for coupling a curtain airbag to a vehicle body according to the embodiment of the present disclosure.

DETAILED DESCRIPTION OF THE DISCLOSURE

Figure 1:
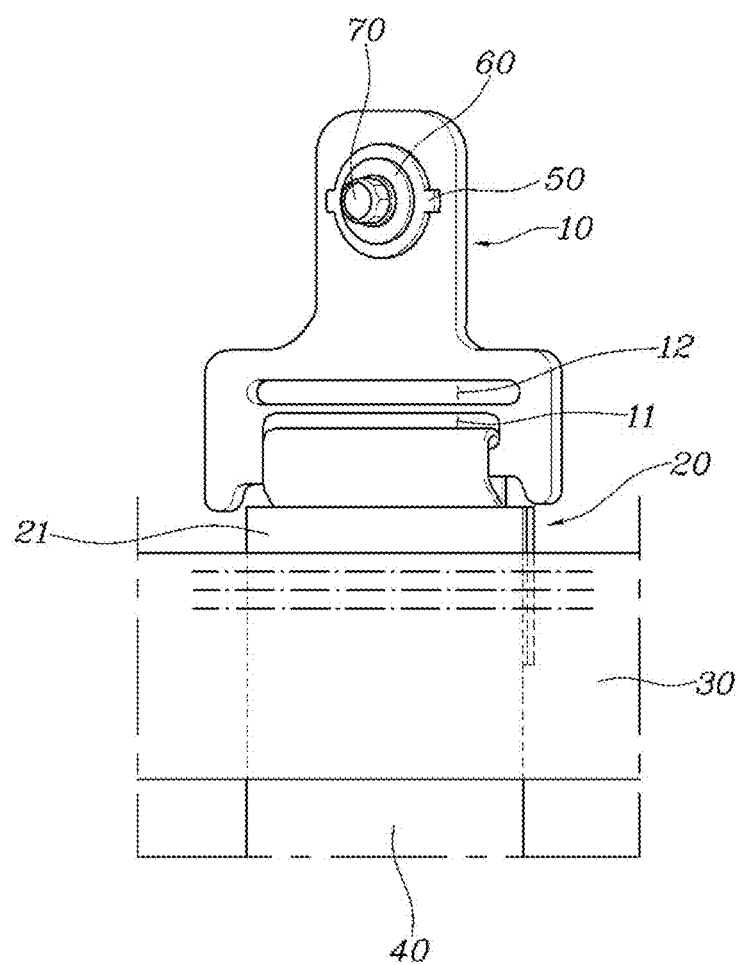
FIG. 1 is a perspective view of a device for coupling a curtain airbag to a vehicle body according to an embodiment of the present disclosure.

Specific structural or functional descriptions of embodiments of the present disclosure disclosed in this specification or application are exemplified only for the purpose of explaining the embodiments according to the present disclosure, the embodiments according to the present disclosure may be carried out in various forms, and it should not be interpreted that the present disclosure is limited to the embodiments described in this specification or application.

Because the embodiments according to the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first" and "second" may be used herein only to describe various elements, but these elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present disclosure. Singular expressions include plural expressions unless clearly described as different meanings in the context. In the present specification, it should be understood the terms "comprises," "comprising," "includes," "including," "containing," "has," "having" or other variations thereof specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present disclosure pertains. The terms such as those defined in commonly used dictionaries should be interpreted as having meanings consistent with meanings in the context of related technologies and should not be interpreted as ideal or excessively formal meanings unless explicitly defined in the present specification.

Hereinafter, the present disclosure will be described in detail through description of preferred embodiments of the present disclosure with reference to the accompanying drawings. Like reference numerals indicated in the respective drawings refer to like members.

Figure 2:
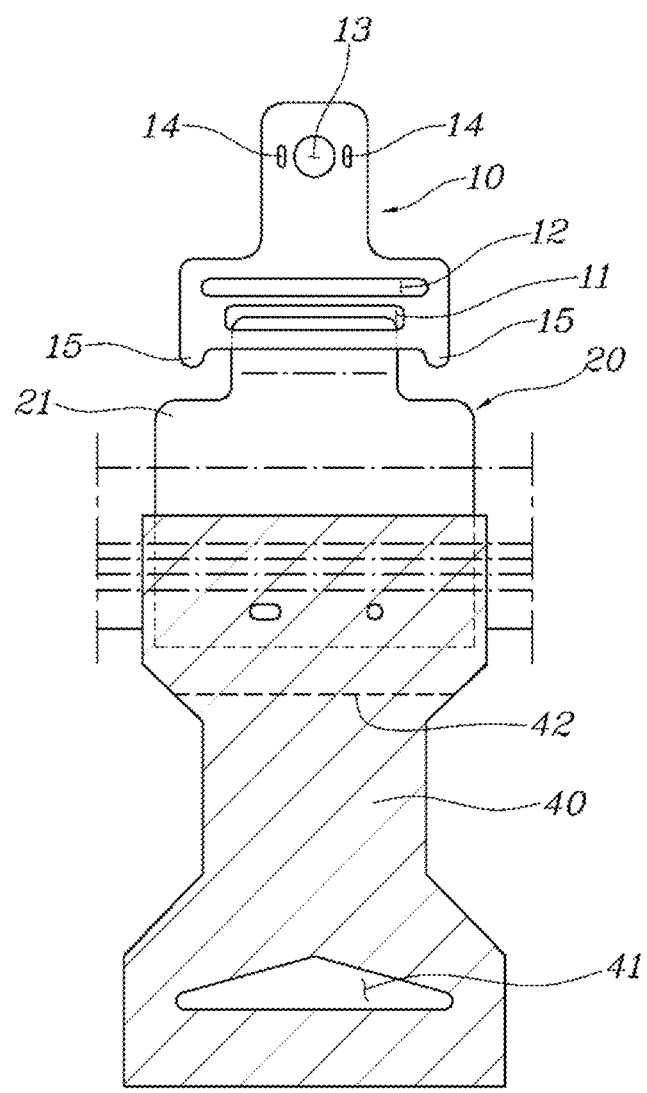
FIG. 2 is a front view of the device for coupling a curtain airbag to a vehicle body according to the embodiment of the present disclosure.

FIG. 1 is a perspective view of a device for coupling a curtain airbag 30 to a vehicle body according to an embodiment of the present disclosure, FIG. 2 is a front view of the device for coupling the curtain airbag 30 to a vehicle body according to the embodiment of the present disclosure, and FIG. 3 is a view illustrating a sequence of coupling the curtain airbag 30 by using the device for coupling the curtain airbag 30 to a vehicle body according to the embodiment of the present disclosure.

In FIG. 3, a first view illustrates a state in which a connection tab 20 is coupled to a bracket 10, a second view illustrates a state in which the curtain airbag 30 is rolled and coupled to the connection tab 20, and a third view illustrates a state in which a strap 40 is coupled to the bracket 10 while surrounding the curtain airbag 30.

An exemplary embodiment of the device for coupling the curtain airbag 30 to a vehicle body according to the present disclosure will be described with reference to FIGS. 1 to 3.

The device for coupling the curtain airbag 30 to a vehicle body according to the present disclosure has been devised to fix the curtain airbag 30 to a roof of the vehicle, the curtain airbag 30 deployed downward from the roof in the event of a collision accident of the vehicle and configured to prevent an injury to a passenger caused by a collision of the passenger with a door or wind glass of the vehicle.

The device for coupling the curtain airbag to a vehicle body according to the present disclosure includes: the bracket 10 made of a metallic material and having an upper end installed on the vehicle body and disposed adjacent to the roof of the vehicle, and a lower end extending downward and having a through-hole 11; and the connection tab 20 having a lower end coupled to a cushion of the curtain airbag 30, having a main body 21 extending upward, and having an upper end extending upward, penetrating the through-hole 11 of the bracket 10, and coupled to the main body 21.

The bracket 10 may be fixed by being coupled to the roof side of the vehicle body and extend downward. The bracket 10 extending downward may have the through-hole 11 formed through the lower end thereof. The bracket 10 may be connected to the connection tab 20 through the through-hole 11.

The through-hole 11 may extend in a direction intersecting a direction in which the bracket 10 extends. The connection tab 20 may have a width corresponding to a length of the extending through-hole 11.

Therefore, a load of the curtain airbag 30 may be dispersed when the connection tab 20 is connected to the through-hole 11.

The connection tab 20 includes the main body 21 extending downward. The upper end of the connection tab 20 may penetrate the through-hole 11 of the bracket 10 and be bent downward and then coupled to the main body 21.

The upper end of the connection tab 20 may be coupled to the main body 21 by means of sewing or a bonding agent.

The lower end of the connection tab 20 may be connected to the curtain airbag 30. The curtain airbag 30 may extend downward and cover the door of the vehicle.

The bracket 10 may be made of a metallic material. The metallic material may be a hard metallic material such as steel, aluminum, or alloy steel.

In addition, the lower end of the connection tab 20 may be coupled to the curtain airbag 30 by sewing. To this end, the connection tab 20 may be made of a fabric material that may be sewn.

The bracket 10 coupled to the vehicle body may be made of a metallic material and support a load of the curtain airbag 30, and the connection tab 20 may be coupled to the bracket 10 and the curtain airbag 30 by sewing. Therefore, it is possible to strongly support the airbag cushion.

In the related art, because the connection tab 20 is coupled directly to the vehicle body, there is a problem in that the connection tab 20 made of a fabric material is damaged by a load of the curtain airbag 30. However, according to the device for coupling the curtain airbag 30 to a vehicle body according to the present disclosure, the bracket 10 made of a metallic material may be coupled to the roof side of the vehicle body and support the load of the airbag cushion. Therefore, it is possible to prevent the curtain airbag 30 from being decoupled from the vehicle body.

The device may further include the strap 40 having one end coupled to the lower end of the connection tab 20, and the other end connected to the bracket 10 while surrounding an outer peripheral surface of the curtain airbag 30 in the state in which the cushion of the curtain airbag 30 is rolled.

The curtain airbag 30 may be connected to one side of the lower end of the connection tab 20 by sewing, and one end of the strap 40 may be connected to the other side of the lower end of the connection tab 20. The curtain airbag 30 may be rolled upward, and the other end of the strap 40 may surround the outer peripheral surface of the rolled curtain airbag 30 and then be fixed by being connected to the bracket 10.

Therefore, the curtain airbag 30 is compressed and fixed to the roof side of the vehicle, such that the interior of the vehicle may be cleanly organized.

In addition, in the event of a collision accident of the vehicle, the curtain airbag 30 may be deployed as gas is injected into the curtain airbag 30. In this case, the deployment pressure may unfix the strap 40 and deploy the curtain airbag 30 downward.

The bracket 10 may include a strap hole 12 positioned and penetratively formed in a portion above the through-hole 11. The other end of the strap 40 may surround the outer peripheral surface of the airbag cushion, pass through the through-hole 11, and be fixed to the bracket 10 or the connection tab 20.

As illustrated in FIGS. 1 and 2, the strap hole 12 is penetratively formed in the bracket 10 and disposed at a position spaced apart upward from the through-hole 11. The other end of the strap 40 surrounding the outer peripheral surface of the rolled curtain airbag 30 may be inserted into the strap hole 12 and connected to the bracket 10.

The other end of the strap 40 inserted into the strap hole 12 may be connected to the bracket 10 by various coupling methods, securely fix the rolled curtain airbag 30, and maintain the state in which the curtain airbag is rolled.

As a first embodiment of the method of fixing the strap 40 according to the present disclosure, the other end of the strap 40 having passed through the strap hole 12 may pass through the through-hole 11 and then fix the rolled cushion of the curtain airbag 30.

That is, the other end of strap 40 may pass through the strap hole 12 and then pass through the through-hole 11, such that the strap 40 may be fixed to the bracket 10 by a frictional force of the strap 40.

The through-hole 11 formed in the bracket 10 may have a size that allows the other end of the strap 40 to be inserted into the through-hole 11 in the state in which the bracket 10 is connected to the connection tab 20. Therefore, the other end of the strap 40 may be inserted into the through-hole 11.

The strap 40 may be fixed to the bracket 10 as described above. Therefore, a separate machine process need not be added, and manufacturing costs may be reduced.

As a second embodiment of the method of fixing the strap 40 according to the present disclosure, the other end of the strap 40 having passed through the strap hole 12 may be coupled and fixed to the connection tab 20 by sewing.

After the other end of the strap 40 passes through the strap hole 12, the other end of the strap 40 may be coupled to one end of the strap 40 or the connection tab 20 by sewing.

Therefore, the curtain airbag 30 may not be unrolled even though external impact or vibration is applied. At the time of deploying the curtain airbag 30, the deployment pressure may cut the strap 40 and deploy the curtain airbag 30 downward.

As a third embodiment of the method of fixing the strap 40 according to the present disclosure, the device may further include protrusion portions 15 protruding outward from the lower end of the bracket 10. A fixing hole 41 may penetrates the other end of the strap 40. The protrusion portions 15 may be inserted into the fixing hole 41 of the other end of the strap 40 having passed through the strap hole 12, such that the other end of the strap 40 may be fixed to the bracket 10.

As illustrated in FIGS. 1 and 2, the protrusion portions 15 may protrude outward from the lower end of the bracket 10, and the fixing hole 41 may be penetratively formed at the other end of the strap 40. The other end of the strap 40 is inserted into the strap hole 12 and then bent downward, and the protrusion portions 15 protruding downward from the bracket 10 are inserted into the fixing hole 41, such that the strap 40 may be fixed.

Therefore, the third embodiment of the method of fixing the strap 40 according to the present disclosure may more securely fix the rolled state of the curtain airbag 30 than the first embodiment.

The protrusion portions 15 may be provided as a pair of protrusion portions protruding from two opposite ends of the lower end of the bracket 10 based on a leftward/rightward direction, and the fixing hole 41 may extend in the leftward/rightward direction of the bracket 10, such that the pair of protrusion portions 15 may be inserted into the fixing hole 41 and fix the strap 40.

As illustrated in FIGS. 1 and 2, the protrusion portions 15 may be formed at the lower end of the bracket 10. The pair of protrusion portions 15 may be disposed at the two opposite ends of the lower end of the bracket 10 based on the width direction of the bracket 10, and the fixing hole 41 of the strap 40 may extend in the width direction of the strap 40.

As illustrated in FIG. 2, the fixing hole 41 may be formed in a triangular shape extending in the width direction of the strap 40. The fixing hole 41 may have various shapes. As the pair of protrusion portions 15 is inserted into the fixing hole 41, tension may be generated in the width direction of the strap 40 and fix the strap 40.

The strap 40 connected to the bracket 10 may be cut or disconnected from the bracket 10 when the curtain airbag 30 is deployed.

When the curtain airbag 30 is deployed by gas injected into the curtain airbag 30, the strap 40, which is connected and fixed to the bracket 10 by various methods, may be disconnected or cut, such that the rolled curtain airbag 30 may be deployed while being unrolled downward.

Therefore, the curtain airbag 30 may be quickly deployed, which makes it possible to prevent the passenger from colliding with the door or wind glass of the vehicle.

The strap 40 may include a tear line 42 extending in a direction intersecting a longitudinal direction. The curtain airbag 30 may be deployed downward as the tear line 42 is cut by the deployment pressure when the curtain airbag 30 is deployed.

The tear line 42 may be disposed on a middle portion of the strap 40. The tear line 42 may be formed in the direction intersecting the longitudinal direction of the strap 40 so that the strap 40 is easily cut by the deployment pressure when the gas is injected into the curtain airbag 30.

At the time of deploying the curtain airbag 30, the tear line 42 may be cut by the deployment pressure, and a lower side of the strap 40 may be opened, such that the rolled curtain airbag 30 may be deployed downward by its own weight or a pressure of the gas injected into the curtain airbag 30.

Therefore, the curtain airbag 30 may be quickly deployed.

A bolt hole 13 is penetratively formed in the upper end of the bracket 10, and auxiliary holes 14 are penetratively formed in the upper end of the bracket 10 and spaced apart from the bolt hole 13. The bracket 10 may further include: a clip 60 inserted into the bolt hole 13 and the auxiliary holes 14 and configured to restrict a rotation of the bracket 10; a bolt 50 passing through the bolt hole 13 together with the clip 60 and configured to fix the bracket 10 to the roof side of the vehicle; and a washer 70 disposed between the bolt 50 and the clip 60 and configured to disperse a pressure of the bolt 50.

To couple the bracket 10 to the roof side of the vehicle body, the bolt 50 may be inserted into the bolt hole 13 formed in the bracket 10, and the auxiliary holes 14 may be penetratively formed at two opposite sides of the bolt hole 13 and spaced apart from each other.

The clip 60 may simultaneously penetrate the bolt hole 13 and the auxiliary holes 14, and the bolt 50, together with the clip 60, may be coupled to the vehicle body.

Therefore, it is possible to prevent the bracket 10 from being rotated relative to the bolt 50 by vibration or external impact of the vehicle that occurs when the bracket 10 is coupled to the roof side of the vehicle body.

In addition, the washer 70 may be disposed between the bolt 50 and the clip 60, which makes it possible to prevent damage to the bracket 10 or the clip 60 caused by the pressure of the bolt 50 when an operator couples the bolt 50.

While the specific embodiments of the present disclosure have been illustrated and described above, it will be obvious to those skilled in the art that the present disclosure may be variously modified and changed without departing from the technical spirit of the present disclosure defined in the appended claims.

What is claimed is:

1. A device for coupling a curtain airbag to a vehicle body, the device comprising:
    a bracket made of a metallic material and having an upper end configured to be installed on the vehicle body and disposed adjacent to a roof of the vehicle body, and a lower end extending downward and having a through-hole;
    a connection tab having a lower end configured to be coupled to the curtain airbag, having a main body extending upward, and having an upper end extending upward, penetrating the through-hole of the bracket and being coupled to the main body; and
    a strap having one end coupled to the lower end of the connection tab, and a second end connected to the bracket while surrounding an outer peripheral surface of the curtain airbag in a state in which the curtain airbag is rolled,
    wherein a strap hole is formed in the bracket, and the second end of the strap passes through the through-hole and is coupled to the bracket or the connection tab while surrounding the outer peripheral surface of the airbag.

2. The device of claim 1, wherein the second end of the strap having passed through the strap hole passes through the through-hole and fixes the rolled curtain airbag.

3. The device of claim 1, wherein the second end of the strap passed through the strap hole is sewn to the connection tab.

4. The device of claim 1, further comprising:
a protrusion portion protruding outward from a lower end of the bracket; and
a fixing hole formed at the second end of the strap,
wherein the protrusion portion is inserted into the fixing hole having passed through the strap hole such that the strap is fixed to the bracket.

5. The device of claim 4, wherein the protrusion portion is provided as a pair of protrusion portions protruding from two opposite ends of the lower end of the bracket based on a leftward/rightward direction, the fixing hole extends in the leftward/rightward direction of the bracket, and the pair of protrusion portions is inserted into the fixing hole.

6. The device of claim 1, wherein the strap connected to the bracket is cut or disconnected from the bracket when the curtain airbag is deployed.

7. The device of claim 6, wherein the strap comprises a tear line extending in a direction intersecting a longitudinal direction, and the tear line is cut by a deployment pressure when the curtain airbag is deployed, such that the curtain airbag is deployed downward.

8. The device of claim 1, wherein the connection tab is made of a fabric material and is sewn to the curtain airbag.

9. A device for coupling a curtain airbag to a vehicle body, the device comprising:
a bracket made of a metallic material and having an upper end configured to be installed on the vehicle body and disposed adjacent to a roof of the vehicle body, and a lower end extending downward and having a through-hole; and
a connection tab having a lower end configured to be coupled to the curtain airbag, having a main body extending upward, and having an upper end extending upward, penetrating the through-hole of the bracket and being coupled to the main body,
wherein a bolt hole is formed at the bracket, and an auxiliary hole is formed at the bracket and spaced apart from the bolt hole,
wherein the bracket further comprises:
a clip inserted into the bolt hole and the auxiliary hole and configured to restrict a rotation of the bracket;
a bolt passing through the bolt hole together with the clip and configured to fix the bracket to the roof of the vehicle body; and
a washer disposed between the bolt and the clip and configured to disperse a pressure of the bolt.

* * * * *